United States Patent
Wielath et al.

(10) Patent No.: US 8,869,609 B2
(45) Date of Patent: Oct. 28, 2014

(54) FLOW SENSOR HAVING A SENSOR HOUSING WITH MAIN CHANNEL AND A MEASURING CHANNEL WITH CHOKE POINTS

(75) Inventors: Thomas Wielath, Ramersberg (CH); Stefan Bürgi, Zug (CH)

(73) Assignee: Axetris AG, Kagiswil (CH)

( * ) Notice: Subject to any disclaimer, the term of this patent is extended or adjusted under 35 U.S.C. 154(b) by 388 days.

(21) Appl. No.: 13/276,548

(22) Filed: Oct. 19, 2011

(65) Prior Publication Data

US 2012/0125094 A1 May 24, 2012

(30) Foreign Application Priority Data

Nov. 18, 2010 (EP) .................................... 10014736

(51) Int. Cl.
*G01F 5/00* (2006.01)
(52) U.S. Cl.
CPC ....................................... *G01F 5/00* (2013.01)
USPC .......................................................... 73/202
(58) Field of Classification Search
None
See application file for complete search history.

(56) References Cited

U.S. PATENT DOCUMENTS

| | | | | |
|---|---|---|---|---|
| 3,559,482 | A | * | 2/1971 | Baker et al. ................... 73/202.5 |
| 3,851,526 | A | | 12/1974 | Drexel |
| 4,450,718 | A | | 5/1984 | Hartemink |
| 4,790,194 | A | | 12/1988 | Bellows et al. |
| 4,800,754 | A | * | 1/1989 | Korpi ............................... 73/202 |
| 4,858,647 | A | * | 8/1989 | Custer ...................... 137/599.11 |
| 4,961,344 | A | * | 10/1990 | Rodder ............................ 73/202 |
| 6,681,623 | B2 | * | 1/2004 | Bonne et al. ..................... 73/202 |
| 6,826,966 | B1 | | 12/2004 | Karbassi et al. |
| 7,107,834 | B2 | | 9/2006 | Meneghini et al. |
| 2004/0118200 | A1 | | 6/2004 | Hornung et al. |
| 2006/0101908 | A1 | | 5/2006 | Meneghini et al. |
| 2009/0007654 | A1 | * | 1/2009 | Niikawa et al. ................. 73/202 |

FOREIGN PATENT DOCUMENTS

| | | |
|---|---|---|
| CH | 696 006 A5 | 11/2006 |
| EP | 0 552 916 | 7/1993 |
| EP | 0 558 834 | 9/1993 |
| EP | 0 829 793 | 3/1998 |
| EP | 1 091 195 | 4/2001 |
| EP | 1 256 786 | 11/2002 |
| WO | 95/08065 | 3/1995 |

OTHER PUBLICATIONS

EP Search Report for corresponding European Application No. EP 10 01 4736 dated Apr. 6, 2011.

* cited by examiner

*Primary Examiner* — Harshad R Patel
(74) *Attorney, Agent, or Firm* — Renner, Otto, Boisselle & Sklar, LLP

(57) ABSTRACT

A flow sensor for measuring the flow of a gaseous or liquid medium with a sensor housing in which, between an inlet channel and an outlet channel, a flow channel extends that comprises a main channel and a measuring channel that is arranged parallel to the main channel. At least one main channel choke point is arranged in the main channel, and the measuring channel comprises a sensor element for measuring the flow. A measuring channel choke point in the measuring channel on the inlet and/or the outlet side, is arranged with the main channel choke point having at least one passage and the measuring channel choke point having a passage, both passages being of identical shape and extending parallel to each other in the flow direction.

7 Claims, 4 Drawing Sheets

FLOW SENSOR HAVING A SENSOR HOUSING WITH MAIN CHANNEL AND A MEASURING CHANNEL WITH CHOKE POINTS

CROSS-REFERENCE TO RELATED APPLICATION

The present application claims priority under 35 USC §119 to European Patent Application No. 10 014 736.2 filed Nov. 18, 2010, the entire disclosure of which is incorporated herein by reference.

TECHNICAL FIELD OF THE INVENTION

The invention concerns a flow sensor for measuring the flow of a gaseous or liquid medium with a sensor housing in which, between an inlet channel and an outlet channel, a flow channel extends that comprises a main channel and a measuring channel that is arranged parallel to the main channel, with at least one main channel choke point being arranged in the main channel and with the measuring channel comprising a sensor element for measuring the flow.

Such flow sensors are known in a variety of embodiments and are usually called flow meters. The sensor element arranged in the flow channel between the inlet channel and the outlet channel permits the determination of the mass flow of the medium through the flow sensor by measuring a physical value.

DESCRIPTION OF THE RELATED ART

From U.S. Pat. No. 6,826,966 B1, a flow sensor as described above is known that has a choke point in the main channel. The choke point in the main channel increases the flow velocity in the main channel and, depending on its cross-section, also has the effect of changing the pressure in the main channel.

Another device for measuring the flow of a fluid is known from CH 969 006 A5. It comprises a main channel and a side channel, both of which form the flow channel. The side channel that forms a bypass for the main channel has a smaller cross-section compared to the main channel. As measuring channel, the sensor element for measuring the flow is arranged in the side channel. When the cross-section of the measuring channel and of the main channel are known, the mass flow in the main channel can be determined from the mass flow measured in the measuring channel. This results in the total flow through the flow channel of the flow sensor. By means of a shutter acting as choke point, the side channel is divided into two consecutive sections. In the first section that is located in front of the choke point in the flow direction of the medium, laminar flows prevail, and in the second section located after the choke point turbulent flow effects are present. For the purpose of exact measurements, the sensor element is associated with the first section.

The choke point is an area in the flow sensor in which the flow cross-section of the flow channel is constricted so that the flow of the medium at this point is reduced. Compared with other areas of the flow channel, the choke point offers a higher resistance to the medium. It is considered to be a disadvantage of the prior art referred to above that the flow resistance of the main channel and of the side channel (measuring channel) depend on the quantity of flow and that the ratio of division of the quantities of flow is dependent on pressure and temperature. In the prior art referred to above, this is due to the fact that the flow channel has only one choke point that is arranged either in the main channel or in the measuring channel.

Additional special embodiments of flow sensors are known in the prior art, for example, from the publications U.S. Pat. No. 4,800,754, EP 0 552 916, EP 0 829 793, EP 1 091 195, EP 1 256 786, U.S. Pat. No. 7,107,834, U.S. Pat. No. 3,851,526, U.S. Pat. No. 4,450,718 and EP 0 558 834. The flow meters disclosed there each have a main channel and a side channel that comprise one or several flow branches. In order to produce a laminar flow in the flow branches, choke points are provided, in part, in the main channel and/or the side channel (measuring channel).

SUMMARY OF THE INVENTION

The invention addresses the problem of proposing a flow sensor of this type where the ratio of division of the quantities of flow is as independent of pressure and temperature as possible. In addition, it should permit strong turbulences in the main channel without exceeding the measuring range of the sensor element.

According to the invention, this problem is solved by a flow sensor with the characteristics described herein. Additional advantageous embodiments are given in the related claims.

In the flow sensor according to the invention, the main channel choke point comprises at least one passage between the inlet channel and/or outlet channel and the main channel. In case of a single passage provided at the choke point, the passage is ideally configured so that the flow resistance of the main channel corresponds largely to that of the measuring channel. By varying the cross-section of the passage, it is possible to vary the ratio of division of the quantity of flow of the main channel relative to that of the measuring channel, if necessary. Preferably, for changing the ratio of division, it is not the flow cross-section of the passage that is enlarged but an additional passage is added to the choke point instead in order to reduce the flow resistance in the main channel. In this way, it is possible to achieve high flow rates through the main channel without greatly influencing the flow rate through the measuring channel. In the case of high pressure and high flow rates of the medium passing through the flow sensor, this prevents strong turbulent effects in the main channel that might possibly have an interfering effect on the measuring channel and may have the effect of more or less distorting the measuring results of the sensor element, or possibly even cause the measuring range of the flow sensor to be exceeded.

In a preferred embodiment of the invention, with several passages provided at the main channel choke point, these passages are of identical shape and extend parallel to each other in the flow direction of the medium. By adding several such passages at the choke point of the main channel, the ratio of division of the flow rate between the main channel and the measuring channel can be selected as desired. Because all passages are dimensioned the same, they form identical fluidic resistances for the flowing medium, and, as a consequence, also exhibit the same pressure, temperature, and flow behavior so that the ratio of division regarding the main channel and the measuring channel is not influenced by these parameters. A main channel where more than one passage is provided at the choke point will always have a lower fluidic resistance than the measuring channel.

In an advantageous embodiment of the flow sensor according to the invention, the main channel is divided into at least two main channel branches arranged parallel to the measuring channel, with the number of main channel branches determining the mass flow through the main channel. Preferably, at least one main channel branch comprises at least one main channel choke point. Without influencing the mass flow through the measuring channel, by varying the number of main channel branches it is possible to adapt the mass flow through the main channel in a simple way to different media, to different flow rates, or to different feed pressures of the medium.

In an advantageous embodiment of the invention, the main channel, or the main channel branches, comprise a main channel choke point at the inlet and/or the outlet side. This reliably prevents turbulent flows in the main channel that would have a negative effect on the laminar flow in the measuring channel. This reliably reduces the turbulences in the main channel by producing a largely laminar flow of the medium. With choke points arranged at the inlet and at the outlet sides of both the main channel and the measuring channel, mutual influences on the flows are effectively excluded.

In one embodiment, the measuring channel advantageously comprises a measuring channel choke point at the inlet and at the outlet side. The measuring channel choke point has the same effect on the measuring channel as the at least one main channel choke point has on the main channel. It ensures an interference-free laminar flow into the main channel. It was found that measuring channel choke points on the inlet and the outlet side offered special advantages, especially when the main channel comprises only a single choke point.

In an advantageous modification of the flow sensor according to the invention, the measuring channel choke point has a flow-through passage that is shaped in conformity with the passage of the main channel choke point. Ideally, it extends parallel to the at least one passage of the at least one main channel choke point. On the one hand, this ensures that due to the identical dimensions, all fluidic resistances in the measuring channel and the main channel have the same pressure, temperature, and flow behavior so that the ratio of division of the mass flow through the main channel and the measuring channel are not affected by changes of these parameters. On the other hand, this permits a cost-efficient production of all choke points.

In the interest of a more flexible scalability of the flow area of the flow sensor according to the invention through the addition or reduction of passages to the at least one main channel choke point, the main channel choke point preferably comprises several passages that can either be closed permanently when the flow sensor is still in the unassembled state, or can be manually or automatically opened and/or closed after the flow sensor has been assembled. For this purpose, the sensor housing comprises an operating device for the closing and/or opening of at least one passage of the main channel choke point. By means of this operating device, the closing elements for the passages can be set manually, or can be acted upon by means of an electro-mechanical actuator. Due to this possibility for influencing the number of the active passages of the main channel choke point, it is possible to simply adapt the flow sensor according to the invention, individually and after its installation, to different flow rates of a medium. In addition, during the production of the flow sensor, this reduces the number of variants regarding flow quantities of different sizes.

Regarding the production and function of the flow sensor according to the invention, two embodiments of the invention are considered advantageous where the main channel and the measuring channel are arranged in the sensor housing facing each other either on one plane or on different planes. This is especially practical when the flow sensor is of modular design and the main channel and the side channel are formed in a monolithic central part of the sensor housing. Here, the inlet channel and/or the outlet channel of the sensor housing may be arranged on the plane of the main channel and/or the measuring channel, or on some other plane of the sensor housing. An embodiment is preferred where the main channel and/or the measuring channel are not arranged on the plane determined by the inlet channel and the outlet channel. In conjunction with simple geometries of the flow channel and of the inlet channel and the outlet channel of the sensor housing, this makes it possible to employ simple and established production processes for a cost-efficient production of the flow sensor.

In a favored embodiment of the flow sensor according to the invention, the sensor housing consists of several parts. It comprises a first sensor housing part and at least one second sensor housing part in between which the main channel and/or the measuring channel are formed. Here, the main channel or the measuring channel is formed by a recess in the first and/or the second or additional sensor housing parts. Preferably, one sensor housing part comprises the main channel choke point and/or the measuring channel choke point that extends transversely to the main channel and to the measuring channel when the sensor housing parts are assembled. The sensor housing part with the at least one main channel choke point and/or the at least one measuring channel choke point may be provided as an additional sensor housing part joining the sensor housing parts forming the main channel and/or the measuring channel. It appears to be especially practical to arrange the inlet channel and/or the outlet channel of the flow channel on the sensor housing parts with the main channel choke point and/or the measuring channel choke point.

Due to this modular design of the sensor housing, it is possible, by combining certain prefabricated sensor housing parts, to quickly and easily produce different types of flow sensors. The sensor housing parts are assembled and sealed relative to each other with the usual methods familiar to a person skilled in the art. Lines connected with the provided sensor element lead out of the housing conventionally in a fluid-proof arrangement.

Preferably, the recesses for the main channel and the measuring channel, the inlet channel and the outlet channel of the flow channel, and the main channel choke point and the measuring channel choke point, are jointly arranged in a first sensor housing part, with at least a second sensor housing part being provided as a flat counter-holder with or without recess. For example, a non-bending circuit board that carries the sensor element directly may serve as the flat counter-holder. In this case, the connecting lines may be formed by tracks on the circuit board. The circuit board that is at least the size of the first sensor housing part, can be bolted to the first sensor housing part, using sealing methods familiar to a person skilled in the art for producing a seal relative to the housing part. The first sensor housing part forms a central sensor housing part of the modular sensor housing. In this first sensor housing part, the choke points connect the at least one recess of the main channel and the recess of the measuring channel with the inlet channel and/or the outlet channel of the sensor housing. Starting with the recesses of this sensor housing part, it is simple to change the number of the passages and/or the flow-through passages of the choke points between the inlet channel and/or the outlet channel and the main channel as well as the measuring channel by addition or closure. Also, the cross-section of the passages and/or flow-through passages can be changed without problems at a later point, if necessary. This makes it possible to adjust step-by-step the ratio of division of the mass flow between the main channel and the measuring channel in order to change the measuring range of the flow sensor.

Below, the invention is explained in detail with reference to two embodiments shown in the drawing. Additional characteristics of the invention are given in the following description of the embodiment of the invention in conjunction with the claims and the attached drawing. The individual characteristics of the invention may be realized either individually by themselves or in combinations of several in different embodiments of the invention.

DETAILED DESCRIPTION OF THE INVENTION

Figure 1:
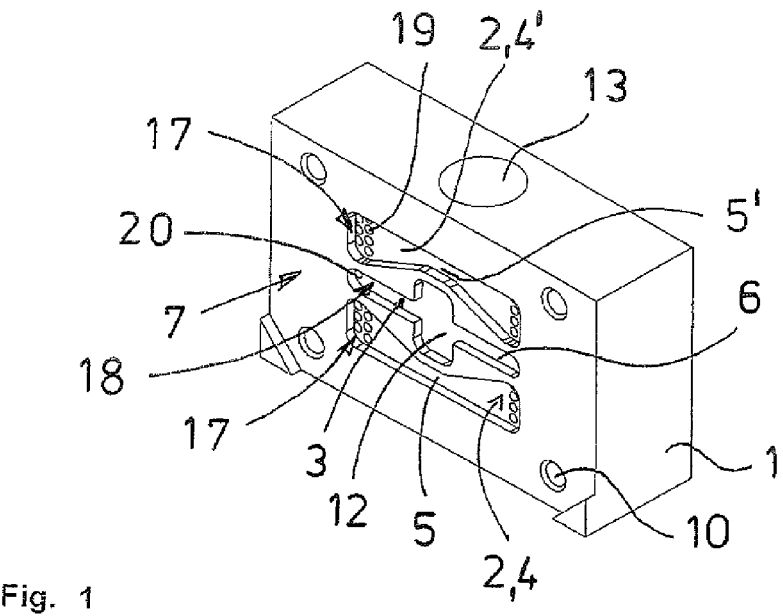
FIG. 1 shows a perspective view of a first embodiment of a central sensor housing part of the flow sensor according to the invention.

FIGS. 1, 2a, 2b show two embodiments of a central sensor housing part 1, 1' of a sensor housing of a flow sensor according to the invention for measuring the flow of a gaseous or liquid medium. Each of the sensor housing parts 1, 1' comprises a main channel 2 and a measuring channel 3 arranged parallel to the main channel 2. In the sensor housing part 1 represented in FIG. 1, the main channel 2 and the measuring channel 3 are arranged on a common plane of the sensor housing part 1. In the second sensor housing part 1' represented in the FIGS. 2a, 2b, the main channel 2 and the measuring channel 3 are arranged on different planes of the sensor housing part 1'.

Figure 2:
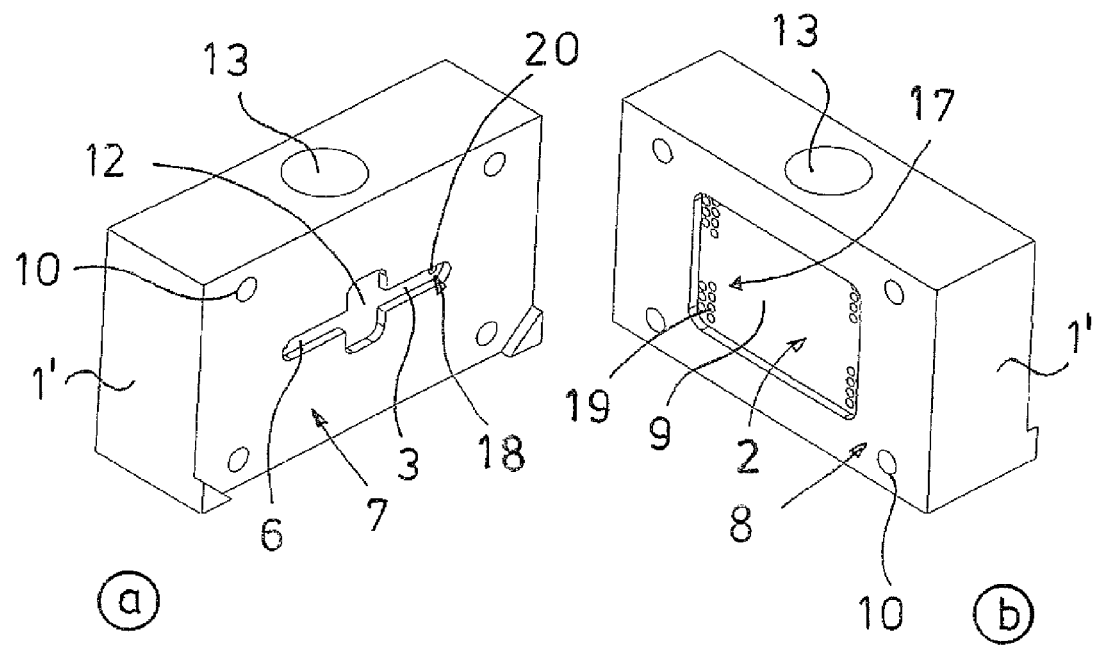
FIG. 2 shows two perspective views (FIGS. 2a, 2b) of a second embodiment of a central sensor housing part of the flow sensor according to the invention.

In the sensor housing part 1 shown in FIG. 1, the main channel 2 is divided into two main channel branches 4, 4'. In the sensor housing part 1' represented in the FIGS. 2a, 2b, the main channel 2 has no branches. In the sensor housing part 1, the main channel branches 4, 4' are arranged symmetrically in relation to the measuring channel 3 on both sides of the measuring channel 3. The two main channel branches 4, 4' are formed by recesses 5, 5' and the measuring channel 3 is formed by the recess 6 on the first flat side 7 of the sensor housing part 1. In contrast, the sensor housing part 1' represented in FIG. 2 comprises only one recess 6 serving as measuring channel 3 on the first flat side 7 (FIG. 2a). The main channel 2 is arranged as the recess 9 on a second flat side 8 of the sensor housing part 1' that is located opposite the first flat side 7 (FIG. 2b).

In order to form measuring channels 3 and main channel branches 4, 4' that are closed in the circumferential direction, or to form a main channel 2 that is closed in similar fashion, additional sensor housing parts (not shown) that are each associated with the flat sides 7, 8 are provided in the embodiments of the flow sensor according to the invention that are represented in the FIGS. 1, 2. These sensor housing parts cover the complete surface of the flat sides 7, 8 of the sensor housing part 1 or 1'. Preferably, they have the form of smooth, flat, plate-shaped sensor housing parts that form a counter-holder, comprising holes that are arranged and shaped to match the four holes 10 of the sensor housing parts 1, 1'. In this way, it is easy to bolt together with a fluid-proof seal the sensor housing parts 1, 1' and the sensor housing parts not shown in the drawing in between which the main channel 2 or the measuring channel 3 are formed.

In addition, approximately at its center, the recess 6 for the measuring channel 3 comprises a widening 12 where a sensor element (not shown in the drawing) for measuring the flow is arranged. An access 13 to the sensor element is provided through which connecting lines connected with the sensor element can be passed to the outside via a fluid-proof seal. The connecting lines can be passed to the outside via a fluid-proof seal as a cable or as a flat printed-circuit foil. Preferably, all sensor housing parts of the sensor housing are made of aluminum and have a simple geometry. They are simple to produce and process by means of simple and well-established production methods.

Figure 3:
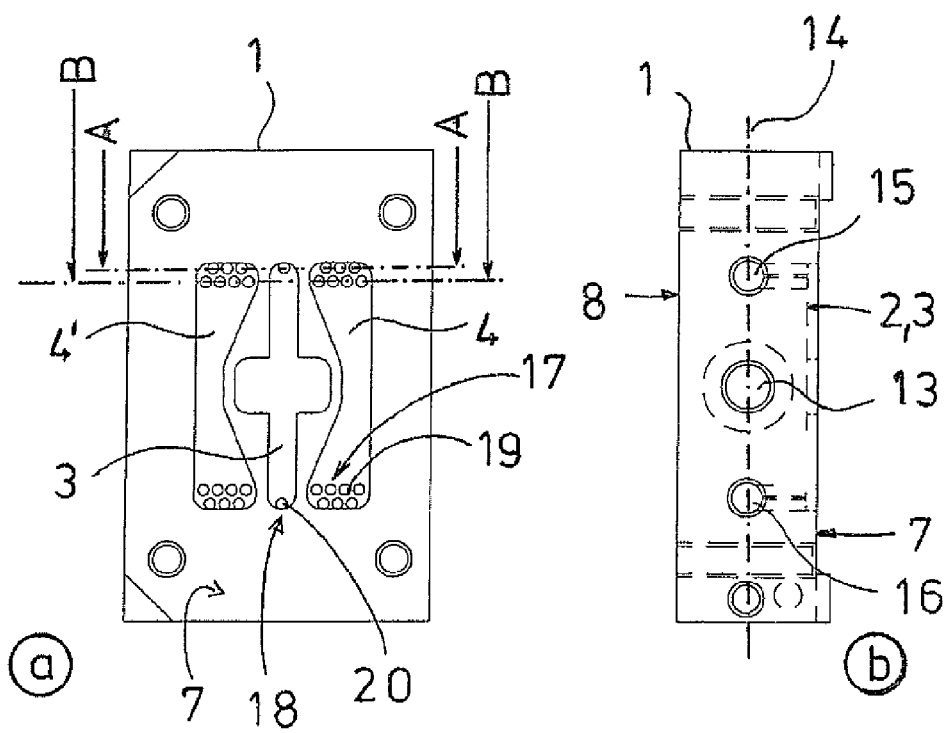
FIG. 3 shows a top view and a side view (FIGS. 3a, 3b) of the first central sensor housing part from FIG. 1.
Figure 4:
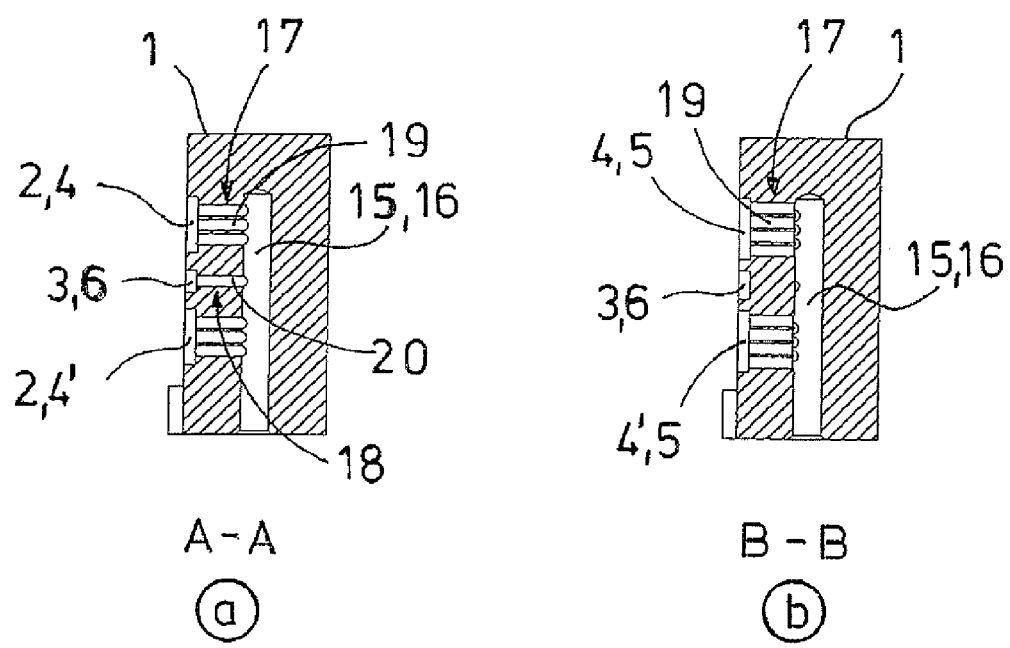
FIG. 4 shows two sectional views of the first central sensor housing part according to FIG. 3 along the section lines A-A (FIG. 4a) and B-B (FIG. 4b)
Figure 5:
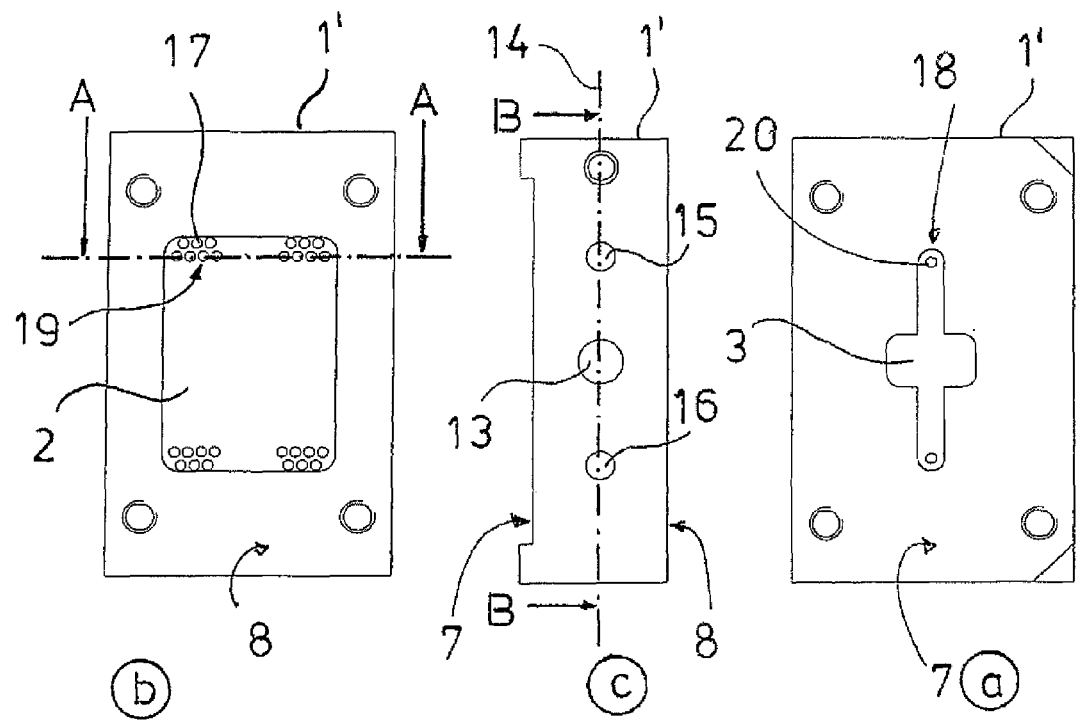
FIG. 5 shows top views from above and from below and a side view of the second central sensor housing part from FIG. 2 (FIGS. 5a, 5b, 5c)

FIGS. 3a and 5a, 5b show a top view of the flat sides 7 and 8, respectively, of the sensor housing parts 1, 1' with the measuring channel 3 and the main channel 2 or the main channel branches 4, 4'. As can be seen from the associated FIGS. 3b and 5c that show a side view of the central sensor housing part 1 and, respectively, the central sensor housing part 1', an inlet channel 15 and an outlet channel 16 are arranged each on a different side of the access 13 on the central plane 14 next to the access 13 and at a distance therefrom. A flow channel formed by the main channel 2 and the measuring channel 3 arranged parallel to the main channel 2 extends between the inlet channel 15 and the outlet channel 16. The four main channel choke points 17 with seven passages 19 each and the two measuring channel choke points 18 with one passage 20 each that extend between the central plane 14 with the inlet channel 15 and, respectively, the outlet channel 16 and the flat sides 7 and 8 on the inlet and outlet side of the measuring channel 3 and the main channel branches 4, 4' of the main channel 2 can be seen clearly.

The cross-sectional views of the sensor housing parts 1, 1' in the FIGS. 4a, 4b and 6a, 6b show the course of the inlet channel 15 and the outlet channel 16. They extend transversely to the main channel 2 or the main channel branches 4, 4' and the measuring channel 3. They pass completely under the channels 2, 3 in the transverse direction. Between the inlet channel 15 as well as the outlet channel 16 and the recesses 5, 9 for the main channel 2, one main channel choke point 17 each is arranged on the inlet and the outlet side of the main channel 2. In addition, between the inlet channel 15 and the outlet channel 16 and the recess 6 for the measuring channel, a measuring channel choke point 18 is provided on the inlet and the outlet side of the measuring channel 3. The main channel choke points 17 each comprise seven passages 19 of identical length and diameter. According to the FIGS. 4a, 4b, 6a, 6b, the passages 19 are arranged parallel to each other in the flow direction of the medium and extend orthogonally to the inlet channel 15, the outlet channel 16, and the recesses 5, 6, 9 for the main channel 2 and the measuring channel 3, respectively. In contrast, the measuring channel choke points 19 each have only one passage 20 that extends parallel to the passages 19. The passages 20 are shaped to match the passages 19 of the main channel choke point 17 in terms of length and diameter.

Figure 6:
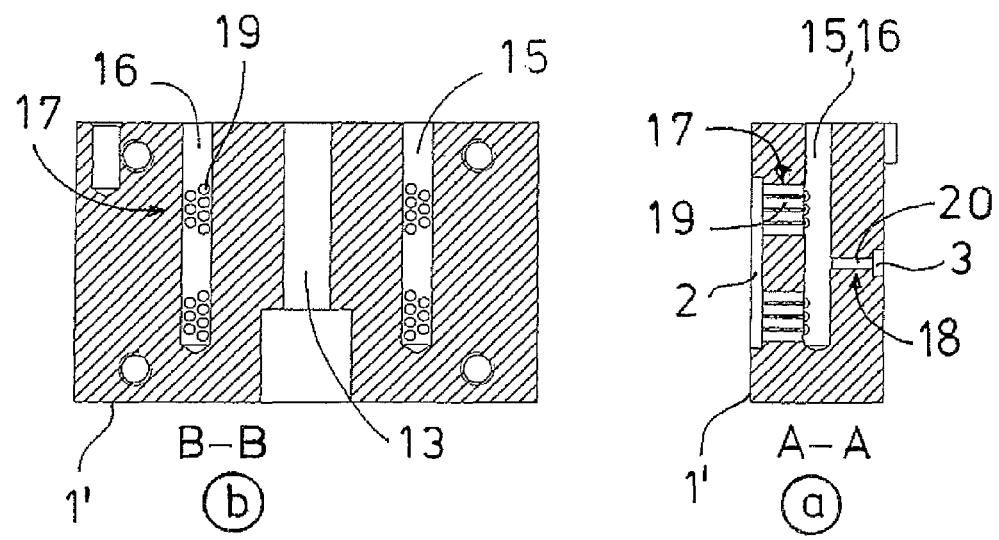
FIG. 6 shows two sectional views of the second central sensor housing part according to FIG. 5 along the section lines A-A (FIG. 6a) and B-B (FIG. 6b)
Figure 7:
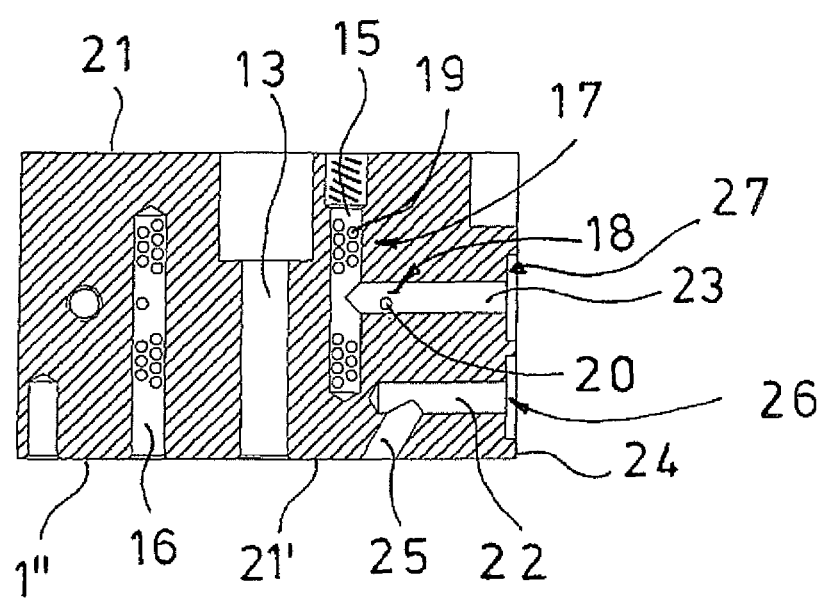
FIG. 7 shows sectional views of a third central sensor housing part with additional line channels for connecting a valve.

FIG. 7 shows a variant of the central sensor housing part 1' represented in FIG. 6 as sensor housing part 1". The sensor housing part 1" differs from the sensor housing part 1' in that it comprises two additional line channels 22, 23 that extend orthogonally away from a lateral side 24 of the sensor housing part 1" and parallel to each other, as well as a feed channel 25 that extends from the same longitudinal side 21' of the sensor housing part 1" as the outlet channel 16. The feed channel 25 opens into the first line channel 22 that is arranged downstream and has an outlet 26 on the lateral side 24 of the sensor housing part 1". The second line channel 23 that has an inlet 27 on the corresponding lateral side 24, opens into the inlet channel 15 that is closed on the longitudinal side 21 of the sensor housing part 1". On the lateral side 24, a valve (not shown in the drawing) can be connected with the outlet 26 and the inlet 27 of the line channels 22, 23. The second line channel 23, that extends downstream of the first line channel 22, is directly connected with the inlet-side passage 20 of the measuring channel (not visible in this Figure) and, via the inlet channel 15, with the inlet-side passages 19 of the main channel (not visible in this Figure).

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

The invention claimed is:

1. A flow sensor for measuring the flow of a gaseous or liquid medium with a sensor housing in which, between an inlet channel and an outlet channel, a flow channel extends that comprises a main channel having and inlet side and an outlet side and a measuring channel having an inlet side and an outlet side that is arranged parallel to the main channel, with one main channel choke point being arranged in the main channel on the inlet side and the outlet side, and with the measuring channel comprising a sensor element for measuring the flow, wherein the main channel choke point comprises at least one passage between the inlet channel and/or the outlet channel and the main channel, and with at least one measuring channel choke point being arranged in the measuring channel on at least one of the inlet side or the outlet side, wherein the sensor housing comprises at least a first sensor housing part and at least one second sensor housing part and at least one other additional sensor housing part, between which at least one of the main channel or the measuring channel is formed as a recess in at least one of the first or the second or the at least one additional sensor housing part, and wherein the first or the second or the one other additional sensor housing part comprises at least one of the main channel choke point or the measuring channel choke point that extends transversely to the main channel and the measuring channel when the sensor housing parts are assembled.

2. The flow sensor according to claim 1, wherein several passages are provided at the main channel choke point that are of identical shape and extend parallel to each other in the flow direction.

3. The flow sensor according to claim 1, wherein the main channel is divided into at least two main channel branches arranged parallel to the measuring channel with at least one main channel branch comprising a main channel choke point.

4. The flow sensor according to claim 1, wherein the measuring channel choke point comprises a passage that is shaped to correspond to the passage of the main channel choke point.

5. The flow sensor according to claim 1, wherein the inlet channel and/or the outlet channel are arranged on a different plane than the main channel and/or the measuring channel, regardless of whether the main channel and the measuring channel are arranged on one plane of the sensor housing or whether the main channel and the measuring channel are arranged on different planes of the sensor housing.

6. The flow sensor according to claim 1, wherein the inlet channel and/or the outlet channel of the flow channel are arranged on the sensor housing part with the main channel choke point and/or the measuring channel choke point.

7. The flow sensor according to claim 1, wherein recesses for the main channel and the measuring channel, the inlet channel and the outlet channel of the flow channel, and the main channel choke point as well as the measuring channel choke point are all arranged in the first sensor housing part, and that the at least second sensor housing part is shaped as a flat counter-holder.

* * * * *